Patented Jan. 9, 1951

2,537,627

UNITED STATES PATENT OFFICE

2,537,627

STABILIZATION OF CHLORINATED RUBBERY POLYMERS

Frederick C. Weissert, Aliquippa, Elizabeth B. Behrend, Pittsburgh, and Raymond C. Briant, Edgewood, Pa., assignors to The Firestone Tire & Rubber Company, Akron, Ohio, a corporation of Ohio No Drawing. Application December 7, 1948, Serial No. 64,032

4 Claims. (Cl. 260—94.7)

This invention relates to the production of chlorinated natural and synthetic elastomers.

Chlorinated natural and synthetic elastomers are chemically somewhat unstable. This instability is manifested by the slow decomposition of these materials in contact with boiling water, and by the tendency of the materials to discolor and become brittle upon exposure to light and air. This defect can be partially remedied by incorporating chemical stabilizers in these products. However, this is not entirely effective, and it would be preferable to improve the inherent stability of the chlorinated elastomers themselves.

Accordingly, it is an object of this invention to prevent the deterioration of chlorinated natural and synthetic elastomers.

Another object is to produce chlorinated natural and synthetic elastomers of high inherent stability.

A further object is to provide a process for the production of chlorinated natural and synthetic elastomers of high stability, which process may be carried out in relatively inexpensive equipment, with a minimum of expert supervision, and with minimum dislocation of existing plant facilities and practice.

SYNOPSIS OF THE INVENTION

The above and other objects are secured, in accordance with this invention, by chlorinating a solution of a natural or synthetic elastomer in the usual manner; adding, to a solution of the chlorinated elastomer so produced, from 1.0% to 2.5%, based on the weight of the original elastomer, of iodine, and also introducing chlorine, if it is not already present in the solution; and then permitting the solution of chlorinated elastomer, iodine and chlorine to stand for at least 10 hours. The chlorinated elastomer isolated from the resultant reaction mass has greatly improved stability against hydrolytic deterioration or light and oxidative aging.

THE ELASTOMER STARTING MATERIALS

Referring first to the natural and synthetic elastomers serving as starting materials for the practice of this invention, natural rubber is the prototype of starting materials of this type. The various diene-type polymeric elastomers, as they have become available, have likewise been found amenable to chlorination to yield products analogous and similar to chlorinated rubber. Generally, the synthetic polymeric materials which have been found susceptible to chlorination are simple polymers of mixed butadiene; copolymers of butadiene with other extraneous ethylenically unsaturated compounds copolymerizable therewith, said copolymers containing at least 65% of butadiene copolymerized therein; simple polymers of unmixed isoprene; copolymers of isoprene with other unsaturated compounds copolymerizable therewith containing at least 65% of isoprene copolymerized therein; and copolymers of butadiene and isoprene together with other extraneous compounds copolymerizable therewith, the total weight of butadiene and isoprene copolymerized in said copolymers being at least 65%. It will be seen that the essential feature of all of these natural and synthetic elastomers is that their polymeric chains shall consist essentially of the polymeric butadiene and/or isoprene structure, which structure constitutes at least 65% of the entirety of the chains, which may be interspersed with not more than 35% of the residues of extraneous unsaturated compounds (if any) copolymerized therein. The extraneous unsaturated compounds which may be copolymerized with butadiene and isoprene are a well-known class of ethylenically unsaturated compounds exemplified in monounsaturated compounds such as vinyl compounds on the order of styrene, the various mono and dichloro styrenes, vinyl chloride, and $\alpha,\beta$-unsaturated nitriles on the order of acrylonitrile, methacrylonitrile, chloroacrylonitrile, fumaronitrile and the like; and vinylidene compounds on the order of vinylidene chloride, vinylidene bromochloride, and the like. Likewise there may be employed doubly unsaturated compounds in which the unsaturated bonds are conjugated, such as 2,3-dimethyl-butadiene-1,3, chloroprene, piperylene, 2-cyano-butadiene-1,3 and the like. For a more extensive list of compounds known to copolymerize with butadiene and isoprene, reference is made to Krczil, "Kurzes Handbuch der Polymerisationstechnik, II, Mehrstoff—Polymerisation," Edwards Brothers Inc., pp. 655 and 656, the items under "Butadiene" and page 682, the items under "Isoprene." The elastomers amenable to the process of this invention may be tabulated as follows.

TABLE A

1. Natural rubber.
2. Elastomeric polybutadiene.
3. Elastomeric copolymers of butadiene with other ethylenically monounsaturated and conjugated ethylenically di-unsaturated compounds copolymerizable therewith, said copolymers containing at least 65% of butadiene copolymerized therein.
4. Elastomeric polyisoprene.
5. Elastomeric copolymers of isoprene with other ethylenically monounsaturated and conjugated ethylenically di-unsaturated compounds copolymerizable therewith, said copolymers containing at least 65% of isoprene copolymerized therein.
6. Elastomeric copolymers of butadiene with isoprene together with other ethylenically monounsaturated and conjugated ethylenically di-unsaturated compounds copolymerizable therewith said copolymers containing a total of at least 65% butadiene and isoprene copolymerized therein.

THE CHLORINATION PROCESS

The general process of chlorinating natural and synthetic elastomers comprises dissolving the elastomer in a suitable solvent and introducing chlorine into the solution. In the case of natural rubber, the usual solvent is carbon tetrachloride which is cheap and completely inert to chlorination. In the case of the synthetic elastomers, the solvent will usually be ethylene dichloride, the use of which avoids certain difficulties attending the formation of an insoluble phase at one stage of the chlorination. The solution takes up chlorine rapidly, up to a maximum of about 66.5–68% in the case of natural rubber, 56–59% in the case of polybutadiene and 62–64% in the case of polyisoprene, all percentages being on the basis of the chlorinated product. At this maximum, the reaction ceases abruptly, and no appreciable further quantities of chlorine are taken up, even after long and drastic conditions of treatment. The conditions of chlorination may be varied widely: the temperature may vary from $-40°$ C. to $+90°$ C., with application of pressure, where necessary to retain the solvent in the reaction mass; the rate of introduction of chlorine is limited only by the problem of cooling the reaction; and the reaction may be accelerated by irradiating the solution with ultraviolet light.

THE TREATMENT WITH CHLORINE AND IODINE

In the practice of this invention, after the elastomer has ceased to take up further chlorine as described above, it is subjected to a combined treatment with chlorine and iodine for at least 10 hours. A convenient mode of execution of this invention consists in adding iodine to the solution of chlorinated rubber at the close of the chlorination reaction during the manufacture thereof, and permitting the solution to stand for at least 10 hours. Inasmuch as the uptake of chlorine during the chlorine-iodine treatment of this invention is very slight, usually the excess chlorine left in the solution from the main chlorination step will be sufficient for the chlorine-iodine treatment of this invention, and no further chlorine need be introduced. At any rate, maintaining a partial pressure of chlorine of about 100 mm. of mercury throughout the treatment will insure an adequate treatment in accordance with this invention. As noted above, the amount of iodine added should be from 1.0% to 2.0%, based on the weight of the original elastomer from which the chlorinated rubber undergoing treatment is derived.

The medium employed in the chlorine-iodine treatment may be any solvent which is at least moderately resistant to chlorination, such as carbon tetrachloride, ethylene dichloride, tetrachloroethylene, hexachlorobutadiene or the like. The temperature may vary from 30° C. to 90° C., pressure being applied if necessary to retain the solvent in the liquid phase.

At the end of the treatment, the chlorinated elastomer is isolated from the treating solution by any convenient method, such as injection into hot water to flash off the solvent, or addition of methanol or other non-solvent for chlorinated rubber to effect precipitation of the chlorinated product from the solution. The resultant chlorinated elastomer product is characterized by greatly enhanced chemical stability, as evidenced by increased resistance to aging by actinic light and oxidation, and by increased hydrolytic stability.

With the foregoing general discussion in mind there are given herewith detailed examples of the practice of this invention. All parts given are by weight.

*Example I.—Natural rubber*

A carbon tetrachloride solution of natural rubber containing 5% of the natural rubber was employed in this example. Several different chlorination runs were made with separate portions of this solution, using different procedures within and without the scope of this invention. In the first run the solution was simply treated with chlorine until the solution refused to take up further quantities of chlorine, then allowed to stand, saturated with chlorine, for 15 hours. In the second the solution was chlorinated to refusal, 2.0% of iodine, based on the weight of original natural rubber, was added, and the solution (still saturated with chlorine) permitted to stand for 15 hours. In the third run, iodine was added to the solution before chlorination, the amount of iodine being 2.0% based on the weight of solution. The solution was then chlorinated to refusal, and permitted to stand for 15 hours. In the fourth run, the solution was chlorinated with exposure to an ultraviolet lamp, until the solution refused to take up further quantities of chlorine, then permitted to stand, saturated with chlorine, for 15 hours. In the fifth run, the solution was chlorinated, with exposure to ultraviolet light, to refusal, 2.0% of iodine, based on the weight of the original rubber in the solution, was added, and the solution, saturated with chlorine, permitted to stand for 15 hours. In the sixth run 2.0% of iodine, based on the weight of rubber in the solution, was added to the solution before chlorination, and the solution chlorinated with exposure to ultraviolet light to refusal, and allowed to stand for 15 hours.

The chlorinated products were isolated from the several solutions by adding methanol to precipitate the products, removing the liquor by filtration, washing the products on the filter with methanol, and drying.

The stabilities of the several resultant products were determined by a procedure in which a 10 gram sample was refluxed at 100° C. in 500 c. c. of distilled water for 100 hours. The percentage of hydrochloric acid liberated, based on the weight of chlorinated rubber sample, was determined by titration and taken as an inverse measure of the stability of the resin. Tabulated herewith are the conditions under which the several runs were made, together with the stabilities, as determined by the above test, of the respective products.

TABLE I

| Run No. | I₂ added before chlorination | Ultraviolet during chlorination | I₂ added after chlorination | Per cent by weight of chlorine in finished chlorinated rubber | Inverse stability (per cent HCl evolved on boiling, based on weight of chlorinated rubber) |
|---|---|---|---|---|---|
| 1 | no | no | no | 67.5 | 0.1 |
| 2 | no | no | yes | 67.5 | 0.03 |
| 3 | yes | no | no | 66.3 | 0.20 |
| 4 | no | yes | no | 66.4 | 0.16 |
| 5 | no | yes | yes | 66.5 | 0.066 |
| 6 | yes | yes | no | 67.0 | 0.35 |

From the table it will be evident that the products (runs 2 and 5) in which iodine was added after chlorination in accordance with this invention, were far superior in hydrolytic stability as compared to the other products, including those products prepared with addition of iodine before chlorination (items 3 and 6). This superiority was also evident in the aging properties of the materials: films and fabric coatings of the products of runs 2 and 5 withstood outdoor aging far better than did films and coatings of the other materials.

*Example II.—Miscellaneous synthetic elastomers*

A series of chlorination runs was made, using various synthetic elastomers set forth in Table II hereinbelow. In each run, the selected elastomer, dissolved in ethylene dichloride to make a 3% solution, was chlorinated until the solution refused to take up further quantities of chlorine, after which the solution, still saturated with chlorine, was permitted to stand for 15 hours. Thereafter the resin was precipitated by addition of methanol, drained free of liquid on a filter, and washed on the filter with further quantities of methanol. Three runs were made on each elastomer: in one run, no iodine was added at any time; in another, iodine, to the extent of 1.5% of the original elastomer in the solution, was added before chlorination was begun; and in still another, iodine, to the extent of 1.5% of the original elastomer, was added after the refusal of the solution to take up further quantities of chlorine. A stability determination similar to that described in Example I was made upon each of the products. Particulars of the several runs are given herewith.

From the table it will be apparent that in every case where iodine was added after chlorination and allowed to stand in accordance with this invention (items Nos. 3, 6, 9, 12) the products have greatly superior hydrolytic stability. This greater stability also shows up in superior resistance of the products to the effects of ultraviolet light in aging.

From the foregoing general disclosure and detailed specific examples, it will be evident that this invention makes possible the production of chlorinated elastomer products of greatly enhanced stability to hydrolytic and oxidative deterioration. The process requires no elaborate apparatus, since the physical manipulations merely involve a quiescent storage of the chlorination products for a few hours. By the same token, the process may be carried out with only a minimum of supervision.

What is claimed is:

1. Process which comprises chlorinating, in solution in the absence of iodine until spontaneous absorption of chlorine has ceased, an elastomer selected from the group consisting of those set forth in Table A, and thereafter further treating the resultant chlorinated elastomer in solution with chlorine and from 1.0 to 2.5%, based on the weight of the elastomer before chlorination, of iodine for at least 10 hours.

2. Process which comprises chlorinating natural rubber in solution in the absence of iodine until spontaneous absorption of chlorine has ceased, and thereafter further treating the resultant chlorinated rubber with chlorine and from 1.0 to 2.5%, based on the weight of the original natural rubber, of iodine for at least 10 hours.

3. Process which comprises chlorinating elastomeric polybutadiene in solution in the absence of iodine until spontaneous absorption of chlorine has ceased, and thereafter further treating the resultant chlorinated rubber with chlorine and from 1.0 to 2.5%, based on the weight of the original polybutadiene, of iodine for at least 10 hours.

TABLE II

| Elastomer Used | Iodine Added | Inverse stability (per cent HCl evolved on boiling) | Run No. |
|---|---|---|---|
| Polybutadiene | None | 0.30 | 1 |
|  | before chlorination | 0.24 | 2 |
|  | after refusal to absorb Cl | 0.13 | 3 |
| Polyisoprene | None | .6 | 4 |
|  | before chlorination | .5 | 5 |
|  | after refusal to absorb Cl | .18 | 6 |
| Copolymer of butadiene 75%, acrylonitrile 25%, by weight. | None | .5 | 7 |
|  | before chlorination | .4 | 8 |
|  | after refusal to absorb Cl | .10 | 9 |

4. Process which comprises chlorinating elastomeric polyisoprene in solution in the absence of iodine until spontaneous absorption of chlorine has ceased, and thereafter further treating the resultant chlorinated rubber with chlorine and from 1.0 to 2.5%, based on the weight of the original polyisoprene, of iodine for at least 10 hours.

FREDERICK C. WEISSERT.
ELIZABETH B. BEHREND.
RAYMOND C. BRIANT.

REFERENCES CITED

The following references are of record in the file of this patent:

UNITED STATES PATENTS

| Number | Name | Date |
| --- | --- | --- |
| 1,527,715 | Thieme | Feb. 24, 1925 |
| 2,136,347 | Wiley | Nov. 8, 1938 |
| 2,449,970 | Borglin | Sept. 28, 1948 |

OTHER REFERENCES

"Soviet Russia," India Rubber World, page 74 (April 1943).

D'Ianni et al.: Ind. Eng. Chem., 38, 1171–80, especially 1176, (Nov. 1946).